United States Patent
Kazama et al.

(10) Patent No.: US 7,233,715 B2
(45) Date of Patent: Jun. 19, 2007

(54) OPTICAL SWITCH AND OPTICAL SWITCH SYSTEM

(75) Inventors: Atsushi Kazama, Chiyoda (JP); Kazuyuki Fukuda, Chiyoda (JP); Masaya Horino, Yasato (JP); Yasuhiro Itou, Kumagaya (JP)

(73) Assignee: Hitachi, Ltd., Tokyo (JP)

( * ) Notice: Subject to any disclaimer, the term of this patent is extended or adjusted under 35 U.S.C. 154(b) by 102 days.

(21) Appl. No.: 10/765,984

(22) Filed: Jan. 29, 2004

(65) Prior Publication Data

US 2004/0184718 A1 Sep. 23, 2004

(30) Foreign Application Priority Data

Mar. 20, 2003 (JP) ............... 2003-076766

(51) Int. Cl.
  *G02B 6/26* (2006.01)
  *G02B 6/42* (2006.01)
(52) U.S. Cl. ............... 385/18; 385/16; 385/17; 359/872; 359/877
(58) Field of Classification Search ............ 385/16–18; 359/872, 877
See application file for complete search history.

(56) References Cited

U.S. PATENT DOCUMENTS

| | | | |
|---|---|---|---|
| 6,490,384 B2* | 12/2002 | Yong | 385/17 |
| 6,549,699 B2 | 4/2003 | Belser et al. | 385/24 |
| 6,690,885 B1* | 2/2004 | Aksyuk et al. | 398/45 |
| 6,704,475 B2* | 3/2004 | Jin et al. | 385/18 |
| 6,947,629 B2* | 9/2005 | Chu et al. | 385/18 |
| 7,088,882 B2* | 8/2006 | Ducellier et al. | 385/17 |
| 7,127,137 B2* | 10/2006 | Bowers et al. | 385/18 |
| 2003/0002782 A1* | 1/2003 | Giles et al. | 385/18 |
| 2003/0091268 A1* | 5/2003 | Frye et al. | 385/18 |
| 2005/0018958 A1* | 1/2005 | Huang et al. | 385/18 |
| 2005/0213877 A1* | 9/2005 | Wu et al. | 385/18 |

FOREIGN PATENT DOCUMENTS

| | | |
|---|---|---|
| JP | A-2002-114099 | 4/2002 |
| JP | A-2002-169107 | 6/2002 |

OTHER PUBLICATIONS

"Development of a Small Easy-to Assemble 3-dimensional MEMS Optical Switch Fabric" in B-12-4 (p. 444) of the prearranged papers for 2002 Institute of Electronic, Information and Communication Engineers Communication Society Convention.

* cited by examiner

*Primary Examiner*—Sung Pak
*Assistant Examiner*—Daniel Petkovsek
(74) *Attorney, Agent, or Firm*—Antonelli, Terry, Stout & Kraus, LLP.

(57) ABSTRACT

A small-size thin-bodied 3-dimensional matrix switch using a micro mirror array, comprises a collimator array with a plurality of collimators coupled to optical fibers, a mirror array with a plurality of movable mirrors, in which each movable mirror has light from a first collimator of the collimator array optically coupled thereto, a first mirror which has the light from the mirror of the mirror array optically coupled thereto, a second mirror which has the light from the first mirror optically coupled thereto, and a second collimator of the collimator array, which has the light from the second mirror coupled thereto, wherein the light leaving the second mirror passes the first mirror and the mirror array and optically couples to the second collimator.

20 Claims, 10 Drawing Sheets

OPTICAL SWITCH AND OPTICAL SWITCH SYSTEM

BACKGROUND OF THE INVENTION

The present invention relates to an optical switch for changing over connections of optical signals transmitted over a plurality of optical fibers and also relates to an optical switch system using the optical switches.

In optical communications using optical fiber, an N×N optical switch is used which receives at its N input ports optical signals arriving on optical fiber, can couple any one of incoming optical signals to one of the N output ports, and this optical switch can change over connections.

In a general structure of the so-called 3-dimensional (or space type) optical matrix switch, a set of a collimator array and a micro mirror array is provided on each of the input and output sides, the collimator array includes a plurality of collimators for emitting an optical beam carrying optical signals into a free-space micro optical system and the micro mirror array includes a plurality of movable micro mirrors normally manufactured by using MEMS (Micro Electromechanical System) technology. The beam emitted from a collimator on the input side is controlled in its direction by two micro mirrors and led to an arbitrary collimator on the output side.

With regard to the structure of an optical switch with a fiber array and an MEMS mirror array, and with a bounce-back mirror placed at a midway point of the optical path, an example is disclosed in JP-A-2002-169107, which is aimed at facilitating the mounting of optical components by using a simplified structure. A structure using a roof-type retroreflector mirror is disclosed in "Development of a Small Easy-to-Assemble 3-dimensional MEMS Optical Switch Fabric" in B-12-4 (p. 444) of the prearranged papers for 2002 Institute of Electronics, Information and Communication Engineers—Communication Society Convention.

BRIEF SUMMARY OF THE INVENTION

In the above-mentioned prior art, however, it was not successful in the attempt to miniaturize the optical switch in full measure. To reduce the size of the 3-dimensional matrix switch, it is necessary to make an effective arrangement of the space for component parts of the switch and also for beam propagation.

In the design of a 3-dimensional optical matrix switch, under a constraint on the maximum optical-path length determined by the capacity of the collimator lens and another limit on the maximum deflection angle of the MEMS mirror device, to connect many channels efficiently, to that end, to maximally prolonging the optical-path range from an input mirror to an output mirror, which is actually utilized for switching over optical paths, the present inventors considered how best the space for the optical path about that range should be arranged.

The optical fiber needs to be laid with a sufficiently gradual curve (normally with a radius of 3 cm or greater) to prevent a transmission loss of light, and a relatively large space is required for laying the fiber depending on the direction in which the optical fibers are placed around in the package.

With the 3-dimensional optical switch of prior art, since the optical path between the input and output mirrors is substantially at right angles to the direction of the optical fibers installed, if one tries to set the fibers in the rectangular package for example, a large dead space will certainly occur in the package.

Therefore, the object of the present invention is to overcome the above problems, make it possible to arrange the component parts efficiently, and thereby provide a small-size and low-profile optical switch.

To solve those problems, the present invention adopts the following structures. Consequently, it becomes possible to provide a small-size low-profile optical switch even if a large number of input and output fibers are connected which are switched over in a 3-dimensional switch structure.

(1) According to a first aspect of the optical switch of the present invention, the optical switch comprises a collimator array with a plurality of collimators coupled to an optical fiber; a mirror array with a plurality of movable mirrors having the light from a first collimator of the collimator array optically coupled thereto; a first mirror having the light from a mirror of the mirror array optically coupled thereto; a second mirror having the light from the first mirror optically coupled thereto; and a second collimator of the collimator array having the light from the second mirror coupled thereto, wherein the light from the second mirror optically couples through the first mirror and the mirror array to the second collimator.

(2) According to a second aspect of the optical switch of the present invention, the optical switch comprises a collimator array with a plurality of collimators coupled to optical fibers; a mirror array with a plurality of movable mirrors having the light from a first collimator of the collimator array optically coupled thereto; a first mirror having the light from a mirror of the mirror array optically coupled thereto; a second mirror having the light from the first mirror optically coupled thereto; a second collimator of the collimator array having the light from the second mirror coupled thereto, wherein the optical path between the first mirror and the second mirror is formed to include a region extending more on the fiber side of the collimators than the other side thereof where the collimators and the fibers are coupled in a longitudinal direction of the collimators.

For example, the optical path between the input collimator and the mirror array may be reverse-directed to and substantially parallel to the optical path between the first mirror and the second mirror.

Or, the mirror array and the first mirror are preferably located more on the side of the collimators than the other side thereof where the collimators and the fibers are coupled in the longitudinal direction of the collimators.

(3) According a third aspect of the optical switch of the present invention, the optical switch is characterized in that the optical path between the first mirror and the second mirror is formed in a position that the optical path laps over the collimator array as viewed in a direction parallel with the direction of the optical path between the mirror array and the first mirror.

The optical path between the first mirror and the second mirror is formed preferably longer than the optical path between the movable mirrors of the mirror array and the first mirror.

Further, the optical path between the first mirror and the second mirror is formed preferably longer than the optical path between the collimators and the movable mirrors of the mirror array.

(4) According to another aspect of the invention, the optical switch system comprises a board; one of the above-mentioned optical switches coupled to a plurality of optical fibers outputs light input from a first optical fiber to a second optical fiber selected by driving a movable mirror; and a control IC for controlling the tilt of the movable mirror so that the input light can be output to the selected second optical fiber.

According to the present invention, by bending the optical path for the light beam, the dead space in the casing can be reduced, making it possible to realize a small-size low-profile optical switch.

For example, with the optical switch of the present invention, it is possible to couple a light beam between an arbitrary input collimator and an arbitrary output collimator of the collimator array. The beam emitted from the input collimator is reflected by the corresponding input micro mirror on the micro mirror array, passed via the first mirror and bounced back by the second mirror, again bent by the first mirror, and then reflected by the corresponding output collimator of the micro mirror array which corresponds to the output collimator, and is incident on the output collimator. The input micro mirror and the output micro mirror can be respectively controlled in angle in order to make the beam correctly incident on the output micro mirror.

By setting up the optical path between the first mirror and the second mirror so as to be longer than the optical path between the collimator array and the mirror array or between the mirror array and the first mirror, it is possible to lower the height of the casing to realize a thin-bodied optical switch, thereby securing the space under the optical path between the first mirror and the second mirror, behind the collimator array as the space to lay and bundle up the fibers.

By the present invention, it is possible to provide a small-size or thin-bodied optical switch.

Other objects, features and advantages of the invention will become apparent from the following description of the embodiments of the invention taken in conjunction with the accompanying drawings.

DETAILED DESCRIPTION OF THE INVENTION

Preferred embodiments of the present invention will be described with reference to the accompanying drawings.

The invention disclosed in this specification is an example and is not limited to this disclosed mode of application. Additions of well-known technology or modifications may be made in the invention.

Figure 1:
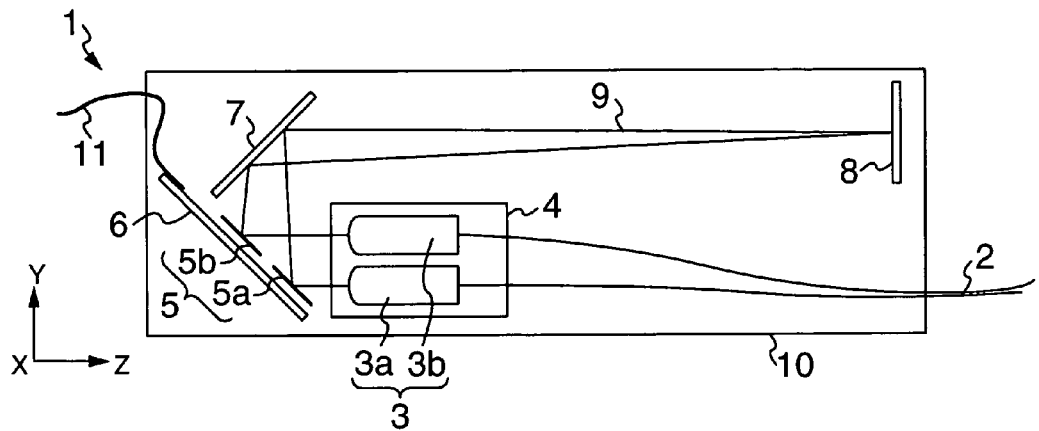
FIG. 1 is a schematic sectional diagram showing the structure of an optical switch according to an embodiment of the present invention.

FIG. 1 is a schematic cross-section diagram showing a first embodiment of the present invention. The optical switch 1 of the present invention comprises a collimator array having arranged therein a plurality of collimators 3 each capable of emitting a beam of light that propagates in the fiber 2; a micro mirror array 6 having arranged therein a plurality of movable micro mirrors 5 each capable of controlling the reflecting direction of the beam; and first and second fixed mirrors 7 and 8, and the optical switch 1 can couple an optical signal between two arbitrary collimators of the collimator array 4. For explanation purposes, X denotes the "depth" direction perpendicular to the page of the paper, Y denotes the height direction, and Z denotes the longitudinal direction as shown in FIG. 1. The embodiment in FIG. 1 shows an example where two collimators 3 are arranged in an array of two rows in the Y-direction, in other words, a plurality of collimators are arranged in the X-direction. For example, supposing that there are 8 rows, the total will be 2×8=16 collimators. The micro mirrors 5 of the micro mirror array 6 are arranged to correspond to the collimators 3 in such a manner that the beams emitted from the collimators are incident on the micro mirrors set in their right positions.

In the optical switch of the present invention, two arbitrary collimators of the collimator array 4 are designated as an input collimator 3a and an output collimator 3b, and the optical switch can couple an optical signal between the input collimator 3a and the output collimator 3b. The beam 9 emitted from the input collimator 3a is reflected by an input micro mirror 5a of the micro mirror array 6 which corresponds to the input collimator 3a, then reflected by the first fixed mirror 7 and further reflected back by the second fixed mirror 8, again reflected by the first fixed mirror 7, reflected by an output micro mirror 5b of the micro mirror array 6 which corresponds to the output collimator 3b, and then injected into the output collimator 3b, by which optical coupling of the optical switch is completed. The angle of the input micro mirror 5a is adjusted so that the beam is correctly incident on the output micro mirror 5b, and the angle of the output micro mirror 5b is adjusted so that the beam is correctly incident on the output collimator 3b. The way in which the input and output collimators are selected as indicated in FIG. 1 is an illustrative example, but other arrangements may be selected, such as their being aligned in the X-direction. In the structure described above, because there are a large number of combinations of inputs and outputs, the optical switch can change over a large number of paths, but it is also possible to adopt a structure such that the collimators both on the input and output sides have been designated previously.

The second fixed mirror 8 is installed to reflect the beam at a midway point of the optical path, by which it is possible to align the micro mirrors with the collimators.

The first fixed mirror 7, which additionally bends the optical path extending from the micro mirror array 6 to the second fixed mirror 8, serves to enclose the optical path in a space as small as possible.

Figure 2:
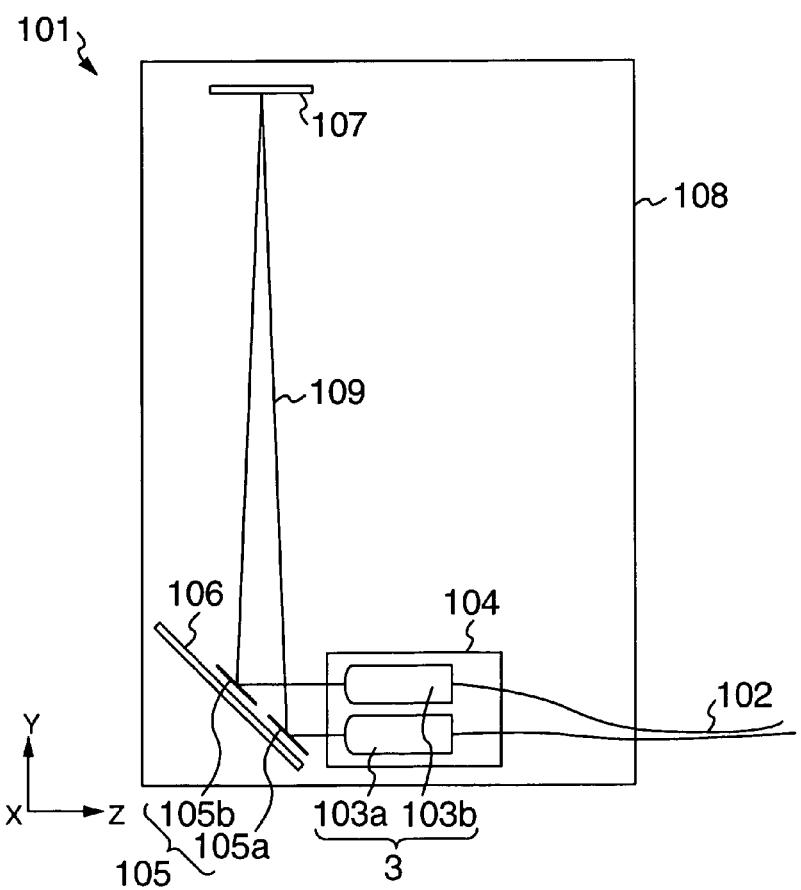
FIG. 2 is a schematic sectional diagram showing the optical switch of a comparative example.

FIG. 2 is a schematic sectional view of the optical switch 101 of a comparative example without any part corresponding to the first fixed mirror 7 in the present invention. Since that which changes over the direction of the beam 109 is a part between the input micro mirror 105a and the output micro mirror 105b lying along the optical path, to couple as many channels as possible under the limited maximum deflection angle and the optical path of a limited length, it is preferable to prolong the optical path between the input and output mirrors as far as possible and consequently shorten the optical path between the collimators 103 and the micro mirrors 105. With the optical switch of the comparative example shown in FIG. 2, it is inevitable for its layout to be formed such that the optical path between the input and output micro mirrors, which should desirably be long (between the micro mirror array 106 and the reflecting fixed mirror 107), is at right angles to the axial direction of the collimators 103 and the fibers 102. Various layouts to accommodate this structure in the casing 108 are conceivable, but if an attempt is made to accommodate this structure in a box-shaped casing, the dead space that occurs in the casing becomes so large that it is difficult to realize a small-size optical switch.

In contrast, with the optical switch of the present invention shown in FIG. 1, the optical path is bent by the first fixed mirror so that the traveling direction of light from the first fixed mirror 7 to the second fixed mirror 8 is made opposite and substantially parallel to the optical path between the collimator array 4 and the micro mirror array 6; therefore, it becomes possible to realize a down-sized optical switch.

The first fixed mirror 7 is disposed near the micro mirror array 6 in a way that the beam reflected by the first fixed mirror 7 does not fall on the collimator array 4 and the optical path between the first fixed mirror 7 and the second fixed mirror 8 is set to be long, so that the height of the casing 10 could be decreased and a thin-profile optical switch realized. Moreover, the space behind the collimator array 4 is utilized to place the fibers 2, with the result that the fibers can be bundled up and drawn out from the casing 10, making it easy to seal the fiber outlet and place fibers 2 outside the casing. In these respects, effective use could be made of the internal space of the casing 10.

Figure 3:
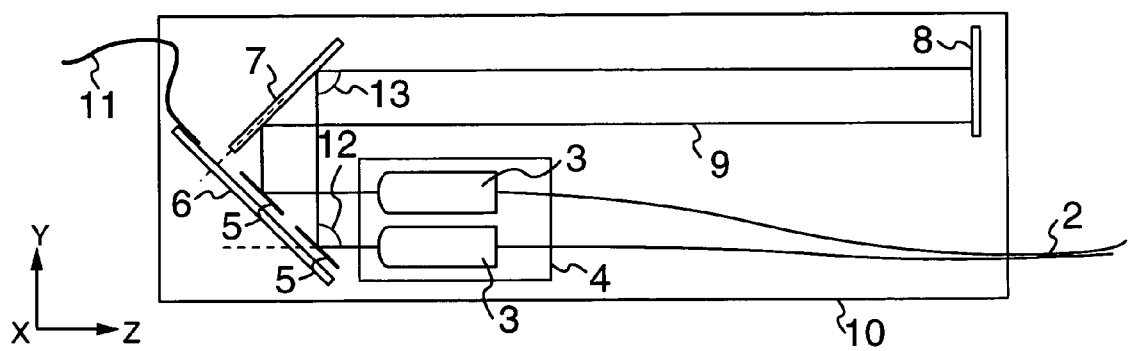
FIG. 3 is a schematic sectional diagram showing the beam path under the condition that the micro mirrors are not actuated in the optical switch according to a modified embodiment of the present invention.

As long as the above-mentioned optical path structure is used, the relative position of the collimator array 4, the micro mirror array 6, and the first fixed array 7 does not matter. However, as shown in FIG. 3, under the condition that the micro mirrors are not actuated, by setting arrangement that the beam reflection angle of the micro mirrors is about 90 degrees and the beam reflection angle of the first fixed mirror is also about 90 degrees, the above-mentioned optical path is realized fairly naturally.

Figure 4:
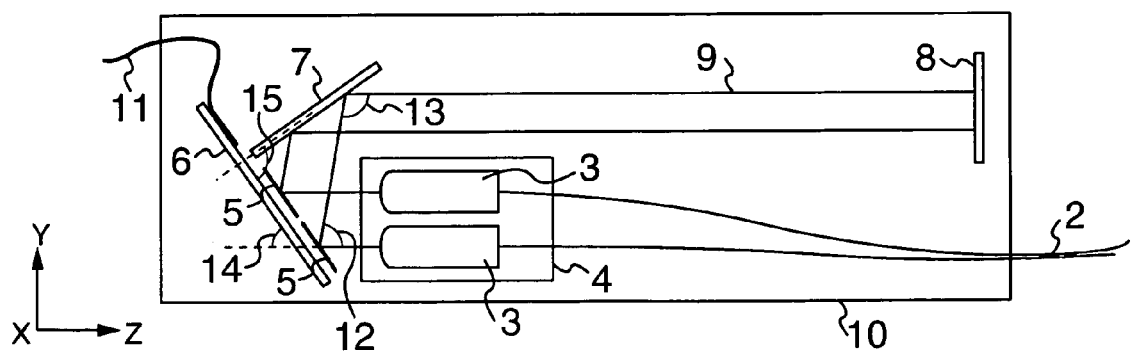
FIG. 4 is a schematic sectional diagram showing the beam path under the condition that the micro mirrors are not actuated in the optical switch according to another modified embodiment of the present invention.

In another mode of embodiment, the beam reflection angle at the micro mirrors 5 is other than 90 degrees. For example, as shown in FIG. 4, the relative angle 14 of the optical axis of the collimators 3 and the micro mirror array 6 may be made larger than 45 degrees and the above-mentioned reflection angles may be set at an angle smaller than 90 degrees. Considering the deflection distance of the beam deflection in the X-direction after the beam was reflected by the micro mirror 5 and the beam bounced back from the second fixed mirror 8, when the beam returns to the micro mirror array 6, the smaller the reflection angle 12 is, the larger the deflection distance of the beam becomes even if the deflection angle of the micro mirror 5 stays unchanged. Therefore, to interconnect the ports with a smaller deflection angle of the micro mirrors, the angle 12 between the optical axis of the collimators and the micro mirror array 6 should preferably be large. For example, preferably the above-mentioned relative angle is increased from the 45 degrees to 60 degrees because the distance that the beam deflects in the X-direction is thereby increased. More preferably, the position and the angle of the micro mirror array 6 are adjusted to prevent the beam reflected by the micro mirrors 5 from unintentionally striking the collimator array 4.

To reduce the height of the casing of the optical switch, the optical path between the first fixed mirror 7 and the second fixed mirror 8 is preferably parallel with the optical paths of the collimators 3 within a manufacturing error tolerance under the condition that the micro mirrors 5 are not actuated. To this end, for an example, the relative angle between the micro mirror array 6 and the first fixed mirror 7 is set at about 90 degrees, and the second fixed mirror 8 is set so as to be perpendicular to the optical axis of the collimator lenses 3.

For the micro mirrors 5, electrostatically driven mirrors manufactured using MEMS (Micro Electromechanical System) technology may be used. In the case of electrostatically driven mirrors, to externally apply voltages to the mirror-driving electrodes of the micro mirror array 6, for example a flexible printed circuit board 11 may be used to electrically connect between the micro mirror array 6 and the control system installed outside the casing of the optical switch. An optical connector for connection to a communication system can be attached to the fibers 2 at one end opposite the other end connected to the collimators, and when necessity arises, by connecting an optical coupler for partially extracting the light beam and a photodiode for detecting light intensity to the end of the fiber, the intensity of optical signals can be monitored. By feeding back information about the monitored intensity of the signal for control of the micro mirrors 5, the intensity of the optical signal can be maintained constant in real time, the signal intensity for each channel can be made stable by prevented it from fluctuating, and therefore it becomes possible to realize an optical switch system having high reliability.

As has been described, preferably, the light beam going to or coming back from the second mirror is arranged so that it is transmitted via the first mirror.

To take an example, the optical switch comprises an input unit (a collimator array for example) with a plurality of light emitters (collimators for example) coupled to an optical fiber; a mirror array (a micro mirror array 6 for example) with a plurality of movable mirrors (micro mirrors 5 for example) illuminated by the light from the light emitter; a first fixed mirror 7 for example) illuminated by the light from a mirror of the mirror array; a second mirror (a second fixed mirror 7 for example) illuminated by the light from the first mirror; and an output unit with a plurality of light receivers coupled to the optical fibers, wherein the light coming from the second mirror is transmitted through the first mirror and the mirror array and illuminates an optical receiver selected from the output unit. To show a concrete example, the optical switch comprises a collimator array 4 with a plurality of collimators 3 coupled to optical fibers 2; a micro mirror array 6 with a plurality of micro mirrors 5 as movable mirrors having the light from a first collimator of the collimator array 4 optically coupled thereto; a first fixed mirror 7 as a first mirror having the light from a mirror 5 of the mirror array 6 optically coupled thereto; a second fixed mirror 8 as second mirror having the light from the first mirror optically coupled thereto; and a second collimator of the collimator array 4 having the light from the second mirror coupled thereto, wherein by making an arrangement that the light from the second fixed mirror 8 optically couples to the second collimator through the first fixed mirror 7 and the micro mirror array 6, it is possible to provide a small-size thin-bodied optical switch even if a large number of input and output fibers are connected which are switched over in a 3-dimensional switch structure.

A sufficient distance should be provided for the optical path extending between the input mirror and the output mirror. Some measure of space is required for connectors of the input and output fibers. Therefore, preferably the input and output lenses are arranged substantially at right angles to the bounce-back mirror through the mirrors or the input lens and the output lens are arranged substantially at right angles to each other through the mirrors.

The output unit and the input unit need not necessarily be clearly separated, but an input-output device may be formed which combines the functions of the input unit and the output unit. By adopting the latter structure, even when a large number of input and output fibers are connected which are switched by 3-dimensional switching, it is possible to provide a small and thin optical switch.

The optical path between the first fixed mirror 7 as the first mirror and the second fixed mirror 8 as the second mirror is preferably formed to include a region extending on the fiber side of the collimators than thereof where the collimators and the fibers are coupled in the longitudinal direction of the collimators.

For example, it may be arranged that the optical path between the input collimator array and the mirror array is reverse-directed to and substantially parallel to the optical path between the first mirror and the second mirror. More specifically, for example, under the condition that the micro mirrors of the micro mirror array are not actuated, the beam traveling direction from the collimator array to the micro mirror array is set to substantially parallel and oppositely directed to the beam traveling direction from the first fixed mirror to the second fixed mirror. Being substantially parallel includes being slightly out of parallel caused by a manufacturing error.

By making the beam traveling direction from the collimator array to the micro mirror array and the beam traveling direction from the first fixed mirror and the second fixed mirror substantially parallel and oppositely directed, the optical path between the first fixed mirror and the second fixed mirror and the collimators and the fibers drawn from the collimators are aligned in the same direction, a fact which serves to reduce the dead space in the casing of the optical switch, making it possible to realize a downsized optical switch.

Let us take a different viewpoint, if one looks in a direction parallel to the optical path direction between the micro mirror array 6 and the first fixed mirror 7, the optical path between the first fixed mirror 7 and the second fixed mirror 8 should preferably be in a position where it laps over the collimator array 4.

Further, the optical path between the first mixed mirror 7 and the second fixed mirror 8 is formed so as to be longer than the optical path between the micro mirrors 5 as movable mirrors of the micro mirror array 6 and the first fixed mirror 7.

Note that the optical paths can be measured with reference to the longest optical path between the mirrors.

Further, the optical path between the first fixed mirror and the second fixed mirror can be set so as to be longer than the optical path between the collimators and the movable mirrors of the micro mirror array.

By making an arrangement that the optical path between the first fixed mirror and the second fixed mirror is longer than the optical path from the collimator array to the micro mirror array 6 or the optical path from the micro mirror array to the first fixed mirror, the height of the casing is reduced and it becomes possible to provide a thin optical switch. In addition, the space under the optical path between the first fixed mirror and the second fixed mirror and at the back of the collimators can be utilized to place and bundle up the optical fibers.

As has been referred to, it is preferable to arrange the micro mirror array, the first fixed mirror and the second fixed mirror such that the beam reflects at about 90 degrees on the micro mirror array and on the first fixed mirror and that the beam reflects about 180 degrees on the second fixed mirror. (It may be specified that measurements be made under the condition that the micro mirrors on the micro mirror array are not actuated.)

In the above-mentioned embodiment, description has been made of a structure in which the light beam from the mirror array travels through the first mirror and goes to the second mirror, and the beam from the second mirror again passes the first mirror and comes to the mirror array, but though there is a demerit of complexity, it is possible to install an input-side collimator and an output-side collimator separately, and form an optical path by which the beam travels from the second mirror to the mirror array through a third mirror instead of through the first mirror with a view to reducing the tilt angle of the movable mirrors of the mirror array.

Figure 5:
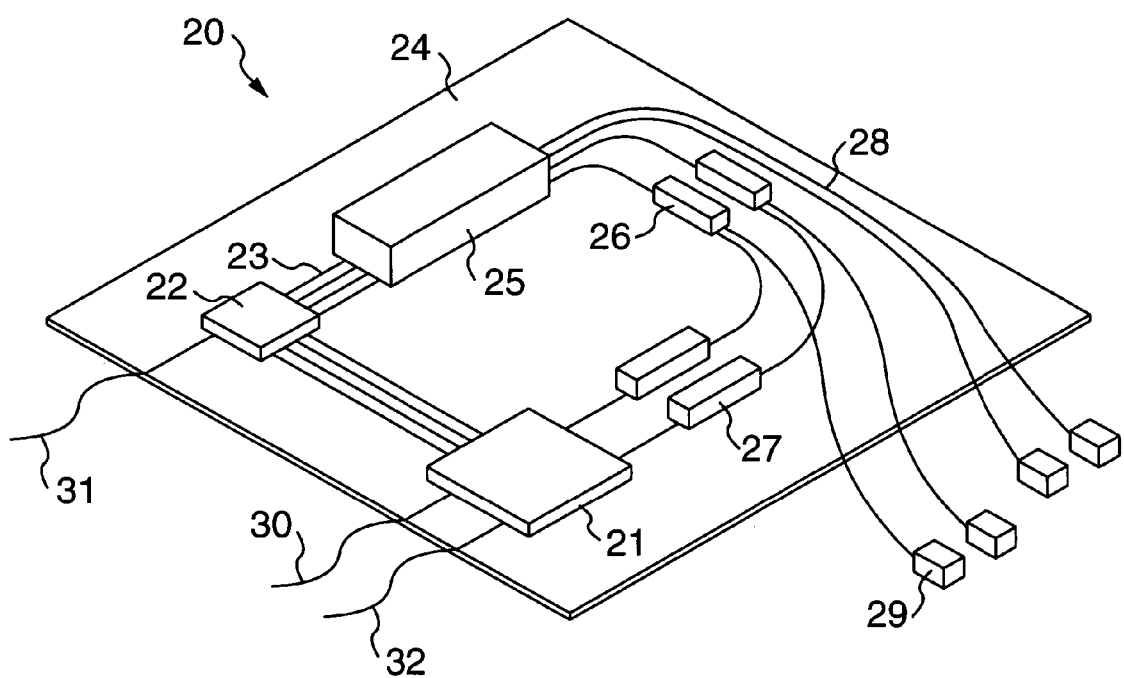
FIG. 5 is a schematic perspective illustration of an optical switch system on which the optical switch of the present invention is mounted.

An optical switch system 20 including peripheral parts mentioned above can be configured as shown in a schematic diagram in FIG. 5 for example. A control IC 21 for controlling micro mirrors, an AMP IC 22, an optical switch are mounted, and circuits to interconnect those parts are laid on the board 24, and optical couplers 26 and photodiodes 27 are installed to organize an optical switch system 20 on the single piece of board 24. Optical fibers 28 can be connected to an optical communication system through optical connectors 29. A power supply line 30, a high-voltage power supply line 31 and a control signal line 32 are connected externally. The example in FIG. 4 shows a 2×2 switch, but the number of channels is not limited by this number. Instead of using the optical couplers 26 and photodiodes 27 separately, tap couplers may be used for high density device integration.

When optical switch systems as mentioned above are mounted on a host optical communication system, a possible layout is to arrange those optical switch boards in parallel on the rack of the optical communication system. If the component parts on the board are made in a low profile, many boards can be mounted on the rack. Since the optical switches 1(25) tend to have a considerable height in an optical switch system, low-height optical switches are preferred.

In a switch system using MEMS mirrors, there is provided a board having mounted thereon an AMP IC and a control IC for driving the MEMS mirrors, and so on. Sometimes it is necessary to mount photodetectors (PD) and optical couplers to detect optical output for feedback control. Packages of optical switches of the present invention are suitable for mounting to configure a system on a board. When only the package of the optical switch has a large height, the optical switch board will occupy a considerable space on the rack of a host system. In this respect, if optical switches of the present invention are used, it is easy to provide a low-bodied package.

If an optical switch system comprises a board; one of the optical switches coupled to a plurality of optical fibers laid on the board outputs light input from a first optical fiber to a second optical fiber selected by driving a movable mirror; a control IC for controlling the tilt of a movable mirror so that the input light is output to a selected second optical fiber, and if the optical switch is used in an embodiment described above, the optical switch system can be provided in a small and thin structure.

As has been described, the optical switch system preferably further comprises an optical coupler 26 for splitting and extracting part of input or output light, and a photodiode 27 for receiving the light split by the optical coupler 26, and the control IC preferably controls applied voltages to adjust the tilt of the mirrors by a signal from the photodiodes 27.

The structure shown in this embodiment is suitable for realizing a thin optical switch as mentioned above. By making uneven the number of arrays in two directions of collimators 3 arrayed in two dimensions, and making the direction of the smaller number of arrays coincide with the advancing direction of the beam reflected by the micro mirror array 6, a thinner optical switch can be realized. In FIG. 1, the number of arrays in the Y-direction is made smaller than the number of arrays in the X-direction. Preferably, by letting the smaller number of arrays be 2 or 1, an optical switch with a height of about 10 mm can be realized.

Figure 6:
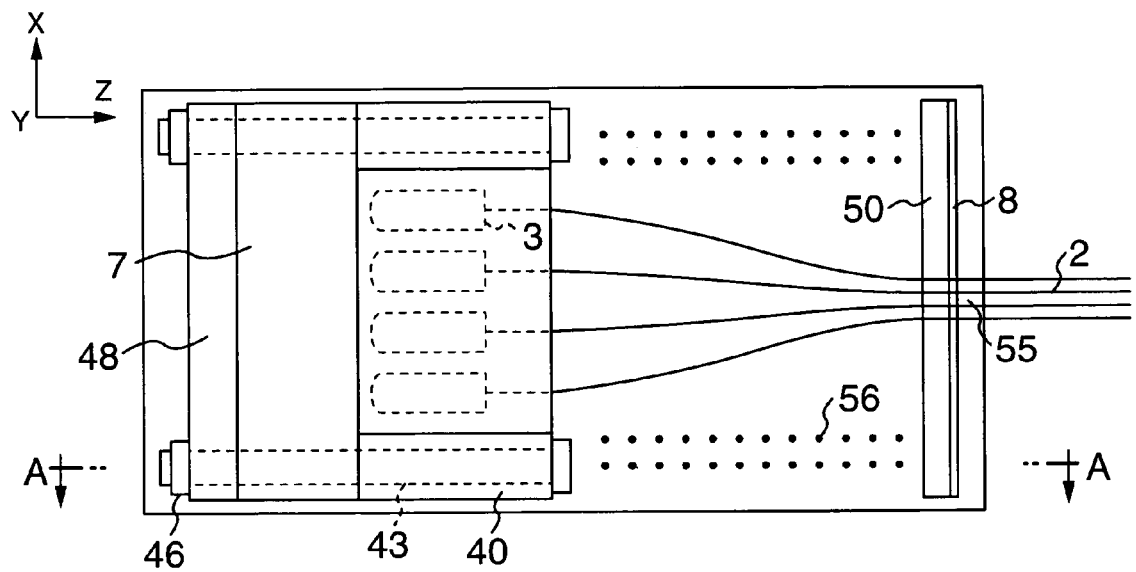
FIG. 6 is a schematic plan view showing an example of the assembled structure of the optical switch according to the first embodiment of the present invention.
Figure 7:
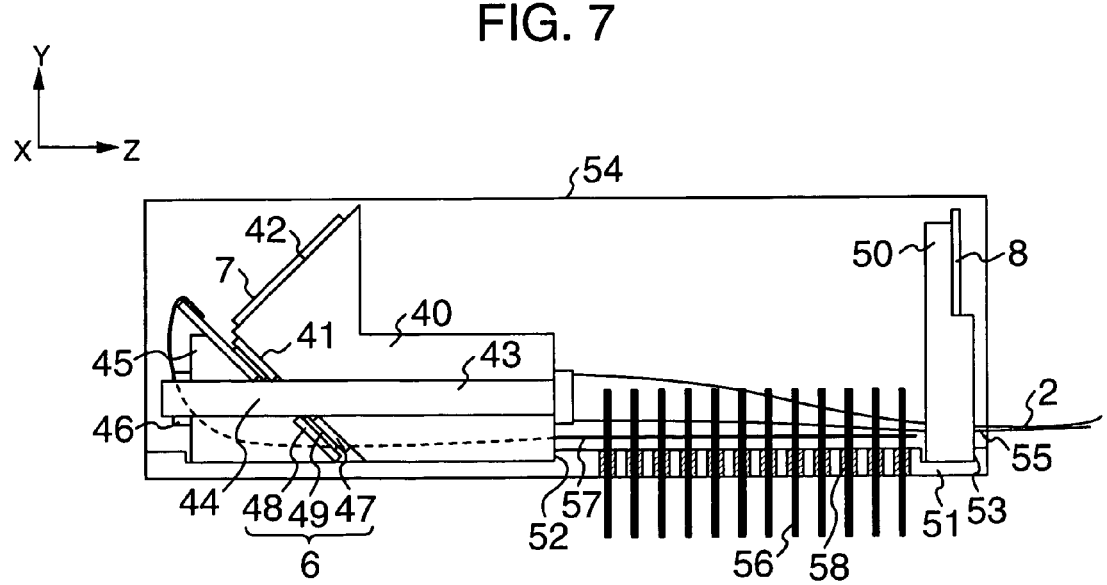
FIG. 7 is a schematic sectional view taken along the line A—A of FIG. 6.

Description will now be made of a concrete method for assembling an optical switch according to an embodiment of the present invention. FIG. 6 is a schematic plan view showing an example of the assembled structure of the optical switch of the present invention. FIG. 7 is a schematic sectional view taken along the line A—A of FIG. 6. In this example, by mounting the micro mirror array 6 and the first fixed mirror 7 directly to a collimator array block 40 as a structural part holding collimators 3 to thereby form the collimator array 4, the collimators 3, the micro mirrors 5 and the first fixed mirror 7 are positioned to each other and fixed. As shown in the plan view in FIG. 7, the collimator array block 40 has collimators 3 arrayed in the center and is positioned at its periphery with respect to the micro mirror array 6 and the first fixed mirror 7. As shown in the sectional view of FIG. 7, the collimator array block 40 has a first inclined plane 41 for deciding its plane direction by being in contact with the micro mirror array 6 and a second inclined plane for deciding its plane angle by being in contact with the first fixed mirror 7.

The micro mirrors 5 of the micro mirror array 6 need to be positioned so that the beams emitted from the collimators 3 corresponding to the collimator array 4 are correctly incident to the micro mirrors. In this example, the micro mirrors 5 are positioned by using guide pins 43. For this purpose, the micro mirror array 6 is provided with through-holes 44 for positioning, and guide pins 43 are passed through the alignment through-holes 44. When the micro mirror array 6 is fixed, the micro mirror array 6 is held between a retainer block 45, which has a third inclined plane to contact the micro mirror array 6, and the collimator array block 40, and fastened with nuts 46 applied to the threaded ends of the guide pins 43. The guide pins 43 are placed in the same direction as the optical axes of the collimators, and the micro mirror array 6 is inclined at an angle of 45 degrees, for example, to the guide pins 43. In this structure, it never occurs that the height of the optical switch is increased by the guide pins 43 or the nuts 46. To facilitate positioning of the micro mirror array 6, the guide pins 43 may be installed in a direction perpendicular to the micro mirror array 6.

When electrostatically driven mirrors, for example, are used for the micro mirror array 6, the mirrors can be formed by stacking a mirror substrate 47 formed in a movable micro mirror structure, an electrode substrate 48 fitted with an electrode for driving the micro mirrors, and a spacer substrate 49 for providing a gap between the micro mirrors and the electrode. The micro mirror 5 is so structured to be rotatable about two axes to deflect the beam in the X- and Y-directions. When the number of arrays in the Y-direction is 1, a 1-axis micro mirror movable only in X-direction is possible in theory, but in order to control the beam direction correctly even if displacement of the optical path occurs due to positioning error or thermal deformation, it is desirable to use a 2-axis micro mirror capable of deflection in the Y-direction. A concrete structural example of the electrostatically driven mirror is described in detail in Japanese Application No. 2002-114099. The alignment through-hole 44 is formed in each of the mirror substrate 47, electrode substrate 48, and spacer substrate 49, and positioning is performed to the guide pins 43.

In many of the 3-dimensional optical matrix switches to which the structure of this embodiment is not applied, it has been necessary to actively align the micro mirror array and the collimator array while checking the incident position of the beam; however, with the optical switch of the present invention, passive positioning is possible by the positioning method described above. By using a small number as the number of arrays in the height (Y-) direction, not only downsizing becomes possible but also the maximum value of the distance between the collimators 3 and the micro mirrors 5 can be decreased, and as a result, it becomes possible to relax demand on positioning accuracy of both of them and it becomes easy to apply a passive positioning method as mentioned above.

With the first fixed mirror 7, the angle of its plane has only to be positioned to such an extent that the deflection angle of the micro mirrors 5, used to realize coupling between arbitrary channels, does not exceeds the capability of the maximum deflection angle, and its setting position need not be very accurate. Therefore, the first fixed mirror 7 has only to be in contact with the second inclined plane 42, or may be directly glued to the second inclined plane 42.

The second fixed mirror 8, as shown in FIG. 7 for example, can be positioned by being glued to the fixed mirror mounting block 50 and by installing the fixed mirror mounting block 50 and the collimator array block 40 on a common block 51. The plane direction of the second fixed mirror 8 has only to be positioned to an extent that the deflection angle of the micro mirrors for realizing coupling between arbitrary channels does not exceed the capability of the maximum deflection angle, and can be positioned by pressing the collimator array block 40 and the fixed mirror mounting block 50 against a first contact face 52 and a second contact face 53 formed on a base 51 for example. This positioning may be performed while checking the optical path of the beam if necessary.

As for materials for the collimator array block 40, the fixed mirror mounting block 50, and the base 51, it is preferable to select materials with coefficients of linear thermal expansion close to the materials of the micro mirror array 6 and the collimator lenses 3 from a viewpoint of preventing worsening of insertion loss. More preferably, the coefficient of linear thermal expansion should be a value intermediate between them. For example, the material for the micro mirror array 6 is monocrystalline silicon for example, and the material for collimator lenses 3 is quartz or optical glass. For the collimator array block 40 and the fixed mirror mounting block 50, and the base 51, the 42 alloy, covar and quartz are suitable materials.

The convenience of the optical switch according to the present invention can be enhanced by making effective use of the space right under the optical path space between the first fixed mirror 7 and the second fixed mirror 8 on the side of the collimator array 3 opposite the side where it radiates a beam.

The fibers 2 extending from the collimators 3 is placed around and bundled up and drawn out from the casing. The casing to accommodate the optical switch can be formed by using the base 52 at the bottom side and the cover 54 enclosing the side areas and the top area. Desirably, the casing is sealed for safety of the operation of the micro mirrors and to prevent entry of dirt and moisture. The fibers 2 can be drawn out from the casing 54 through a fiber outlet 55 formed in the cover 54 or the base 51. Being able to be drawn through one outlet facilitates sealing at the fiber outlet and placing of the fibers 2 outside the casing. At the fiber outlet 55, the fibers are placed in order in fiber-aligning grooves provided in a plate, for example, which is closed by another plate and sealed with a resin or metal. At the sealing point, the resin coating of the fiber is removed to ensure moisture prevention.

As shown in FIGS. 6 and 7, connector pins 56 as an electrical interface to supply voltages to drive the micro mirrors 5 from outside the casing can be arranged in the above-mentioned space. By making a structure that the connector pins 56 protrude from the bottom of the base 51, this optical switch can be inserted directly into a circuit board or a socket, with the result that mounting work is made easy, which is advantageous in building an optical switch system as shown in FIG. 5. If the array pitch of the connector pins 56 is set at 2.54 mm or 1.27 mm, for example, as specified in standards, this increases the convenience. Even when the array area is divided as shown in FIG. 7, setting the pitch at 2.54 mm or 1.27 mm as integer multiples throughout the divided areas is desirable. If the base 51 is made of a metal, to prevent a short-circuit to a connector pin, it is possible to pass the connector pins 56 through through-holes of a large diameter than a pin width, formed in the base 51 for example, and seal the clearances with a sealing material 58. For a substance of the sealing material 58, a low-melting glass may be used, for example. For electrical connection between the connector pins 56 and the electrode substrate 48 of the micro mirror array 6, a flexible circuit board 57 for example may be used, which is passed through a gap formed in the undersurface of the collimator array block 40.

As has been described, as the first support member, there is the collimator array block 40 mounted on the base 51. The collimator array block 40 including a plurality of collimators 3 and the micro mirror array 6 are mounted on this first support member. Consequently, positioning of the collimator array and mirror array can be done easily with accuracy, which heretofore required exact laborious positioning. Moreover, preferably, the first fixed mirror 7 as the first mirror is mounted on the first support member. Further, a second support member separate from the first support member may be mounted on the base 51. As the second support member, the fixed mirror mounting block is available for example, and the second fixed mirror 8 as the second mirror is mounted on the fixed mirror mounting block 50. By this arrangement, the component parts are arranged over a sufficient distance, preventing the structure becoming complicated; therefore, the optical switch can be formed in a simple structure.

Preferably, the collimators are arranged in an array and the number of optical paths at right angles to the optical paths between the mirror array and the first mirror is larger than the number of the optical paths between the mirror array and the first mirror.

Preferably, a plurality of connectors, through which voltages are applied to the mirrors from outside, are provided on the base 51 in a range between the first support member and the second support member. For example, the plurality of connectors can be divided into multiple groups of connectors, the connector groups being arranged in mutually spaced apart relation, and the optical fibers coupled to the collimators can be placed in order in the regions between the connector groups. Preferably, the coupling routes between the mirror array and the connectors run through the gap between the first support member and the base.

Figure 8:
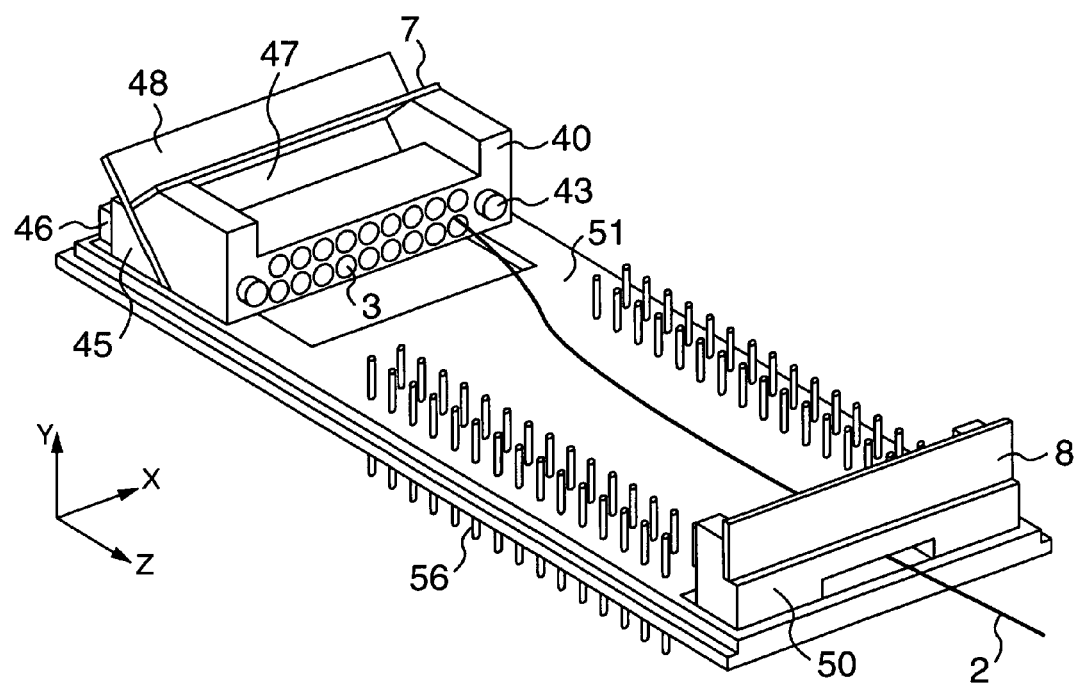
FIG. 8 is a schematic perspective view showing an example of the assembled structure of the optical switch of the first embodiment of the present invention.

FIG. 8 is a perspective view showing an example of the optical switch in the present invention. In FIG. 8, the flexible circuit board 57, most of the fibers 2, and the cover 54 are omitted. The collimator array block 40 is so formed to have its middle portion hollowed out so as not to interfere with the optical path between the first fixed mirror 7 and the second fixed mirror 8.

FIG. 8 shows an example that the number of arrays in the X-direction is 9 and the number of arrays in the Y-direction is 2; therefore, the total number of channels is 19. In the optical switch in this example, the 18 channels can be apportioned in different ways, such as 8×8 (2 spares), 1×16 (1 spare), 2×16, 4 sets of 2×2 (2 spares), and 9 sets of 1×2; to put it differently, optical switches of various arrangements can be realized on the same structure.

Specially, preferably, the collimators of the collimator array are provided in 2-dimension array, and the number of collimator arrays in a direction equal to the traveling direction (Y) of the beams from the micro mirrors to the first fixed mirror is smaller than the number of collimator arrays at right angles to the collimator arrays in the Y-direction.

For example, preferably, the collimators of the collimator array may be provided in 2-dimensional array, and the number of collimator arrays in a direction equal to the traveling direction (Y) of the beams from the micro mirrors to the first fixed mirror may be 1 or 2.

Description will now be made of concrete structures of the mirror substrate 47, the electrode substrate 48 and spacer substrate 49, which constitute the micro mirror array 6.

Figure 9A:
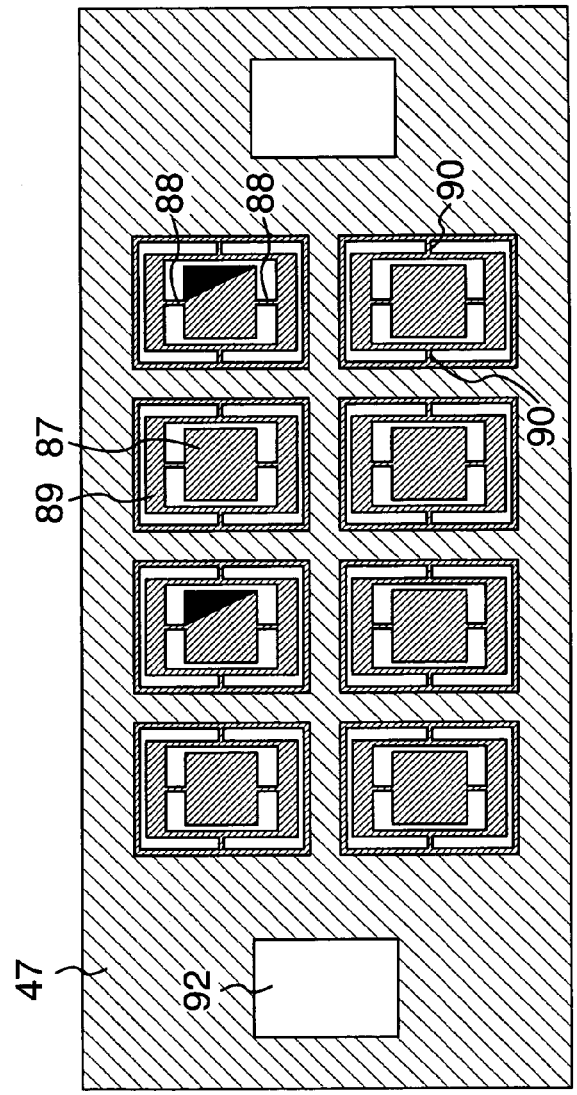
FIG. 9A is a schematic plan view showing an example of the structure of a mirror substrate as a component part of the micro mirror array.
Figure 9B:
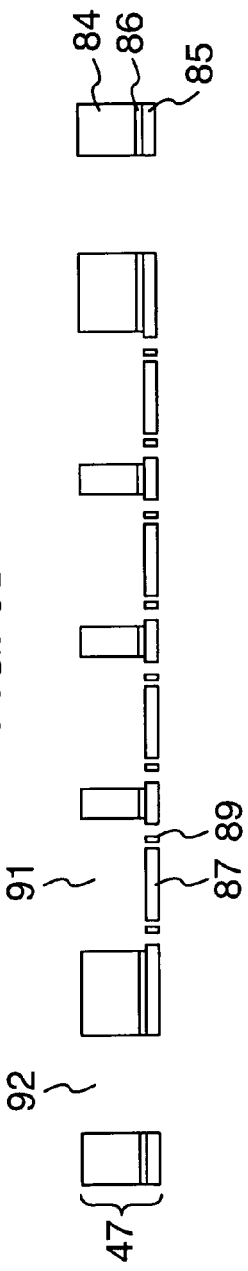
FIG. 9B is a schematic sectional view showing an example of the structure of the mirror substrate as a component part of the micro mirror array.

FIGS. 9A and 9B are as schematic plan view and a schematic sectional view showing an example of the mirror substrate 47. For simplicity's sake, let us take an example of 2×4 rows. As shown in a sectional view in FIG. 9B, a mirror substrate 47 can be obtained by processing an SOI (Silicon On Insulator) wafer formed by a silicon oxide layer 86 in a sandwich between a first silicon layer 84 and a second silicon layer 85. A mirror structure is formed in the second silicon layer 85, and in a range including the mirror structure, by removing the first silicon layer 85 and the silicon oxide layer 86 to form a cavity 91, the mirror structure is released. As shown in FIG. 9A, in the mirror structure, a movable mirror 87 is connected through a first torsion bar 88 to a movable frame 89, and the movable frame is connected through a second torsion bar 90 to the peripheral portion. The movable mirror 87 can rotate about the first torsion bar 88 as the rotating axis and the movable frame 89 can rotate about the second torsion bar 90 as the rotating axis. With those two kinds of rotation combined, the movable mirror 87 can rotate about two axes. The mirror substrate 47 has a alignment through-hole 92 on each side. The mirror substrate 47 has a alignment through-hole 92 on each side, and by inserting the alignment pins 43 into those through-holes, the mirror substrate can be positioned.

The movable mirror 87 reflects the beam by its surface on the cavity side 91. The surface on the opposite side of the movable mirror 87 is used as an electrode surface so that electrostatic attraction occurs between this electrode and a drive electrode. For this purpose, the mirror substrate 47 is coated on both sides with a thin metal film. To reduce the warp of the movable mirror 87 due to internal stress of the thin metal film, the metal film formed on both sides is preferably formed of the same material and to the same thickness. For example, a thin film of Ti/Au is formed by sputtering.

Figure 10:
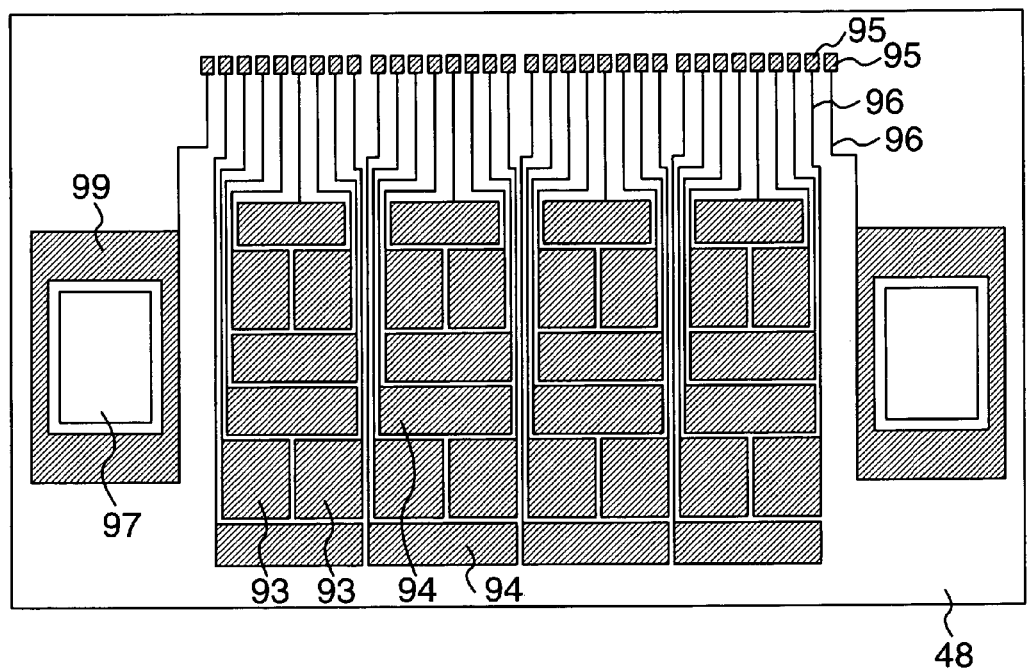
FIG. 10 is a schematic plan view showing an example of the structure of an electrode substrate as a component part of the micro mirror array.

FIG. 10 is a schematic plan view showing an example of the structure of the electrode substrate 48. Though a sectional view is not shown, the electrode substrate 48 can be obtained by forming a silicon oxide film on a single silicon substrate and additionally forming an electrode film, and making patterns in the electrode film. A total of four electrodes—two first drive electrodes 93 for driving a movable mirror 87 and two second drive electrodes 94 for driving a movable frame 89—are provided for each mirror on the mirror substrate 47. To supply voltages to the electrodes, the electrodes are connected by wires 96 to external-connection electrodes which are disposed at the periphery of the electrode substrate 48. Though the drive electrodes are kept at a fixed voltage, it sometimes occurs that the mirror angles gradually change due to a phenomenon that electric charge accumulates over time on those exposed portions of the silicon oxide, which are formed between the adjacent electrodes. For this reason, it is desired that the gaps between the adjacent first drive electrodes 93, second drive electrodes 94 and wires 96 should be reduced. In other words, in such a way as to reduce the gaps to the greatest extent before a short-circuit occurs between the adjacent metal pieces, the first drive electrodes 93 and the second drive electrodes should be spread. The electrode substrate 48, like in the mirror substrate 47, has a alignment through-hole 97 on each side, and by passing the alignment pins 43 into the through-holes, positioning is carried out.

Figure 11:
FIG. 11 is a schematic plan view showing an example of the structure of a spacer substrate as a component part of the micro mirror array.

FIG. 11 is a schematic plan view showing the structure of the spacers 49. To makes it possible to process a silicon substrate as material and to produce gaps of adequate height between the mirror substrate 47 and the electrode substrate 48 according to the design of the mirror actuator, the thickness of the spacers 49 is adjusted by using wet etching of silicon, for example. In this example, two spacers each with one alignment through-hole 98 are used to correspond to two alignment through-holes of each of the mirror substrate 47 and the electrode substrate 48. By passing a alignment pin into the alignment through-hole 98, positioning is performed. However, because the horizontal direction position of the spacer need not be set with high accuracy, its dimensional accuracy of the alignment through-hole 98 may be lower than that of the alignment through-holes of the mirror substrate 47 and the electrode substrate 48.

With regard to the method of driving mirrors, the angle of each mirror can be controlled independently by keeping all movable mirrors 87 and movable frames 89 at ground potential and selectively supplying a suitable voltage to the first drive electrodes 93 and the second drive electrodes 94. As for the method for connecting the movable mirrors 87 and the movable frames 88 to ground, as shown in FIG. 10, the mirror substrate connecting electrode 99 connected by a wire 96 to one external connection electrode 95 is placed at the periphery of each alignment through-hole on the electrode substrate 48, and a conductive film is deposited on the surface of the spacer 49. Since the mirror substrate 47 is covered on both sides with a metal film, all movable mirrors 87 and movable frames 89 are connected to one of the external connection electrode 95 through the spacer 49 and the mirror substrate connection electrode 99.

The external connection electrodes 95 on the electrode substrate 48 are connected to a control system through a flexible circuit board, for example. For instance, in the structural example of the optical switch in FIG. 8, because the flexible circuit board drawn from the electrode substrate is connected at the other end to the connector pins 56 through the collimator array block 40 and the base 51, the flexible circuit board can be mounted on a control circuit board or the like through the connector pins 56.

Figure 12:
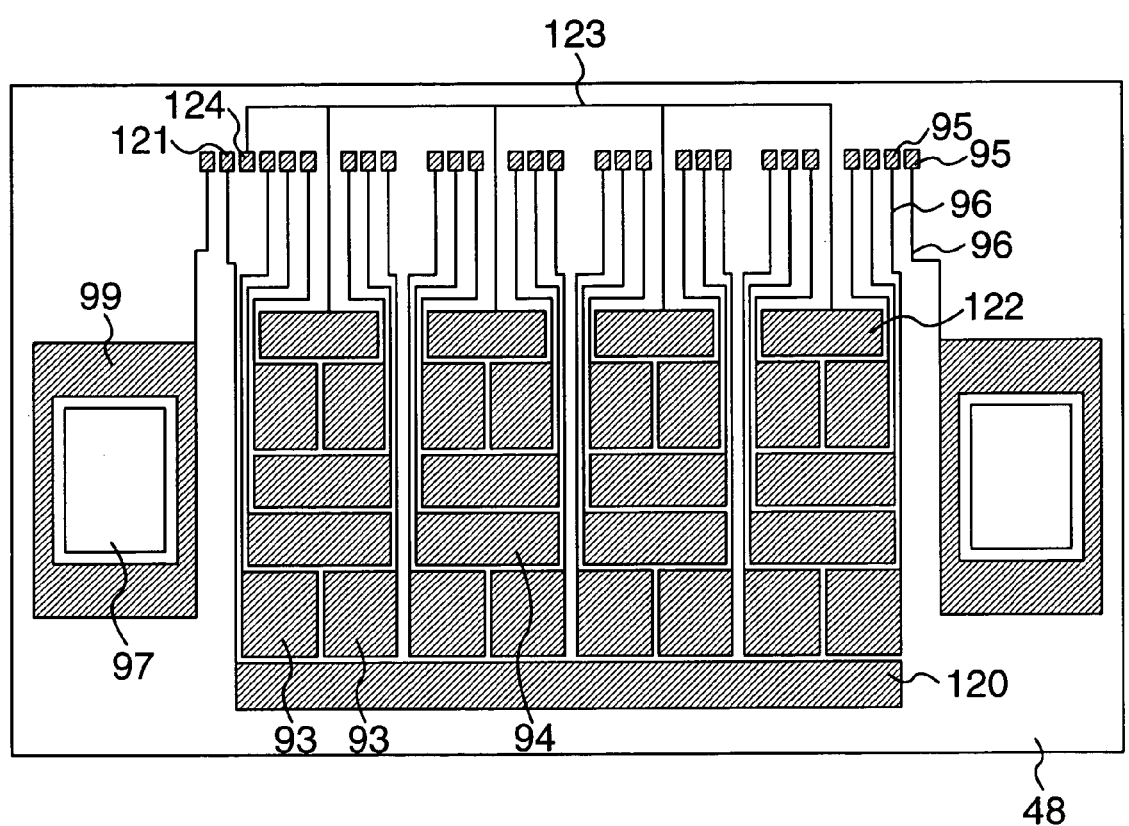
FIG. 12 is a schematic plan view showing an example of the structure of the electrode substrate as a component part of the micro mirror array.

To minimize the number of the drive electrodes 93, the electrodes may be arranged as shown in FIG. 12, for example. When any arbitrary ports are coupled in an optical switch, since the mirror angle is adjusted so that a reflected beam strikes any other mirror; therefore, basically, the mirrors are not tilted to such a direction that the beam goes out of the mirror array area. In other words, in the case where the mirrors are arranged in two stages in the Y-direction, primarily, the drive electrodes to turn the movable frames down are not required for the mirrors on the lower stage, and the drive electrodes to turn the movable frames up are not required for the mirrors on the upper stage. In fact, however, because there are errors that occur in assembling, the above-mentioned drive electrodes are sometimes required. By mutually connecting the drive electrodes and applying a fixed voltage to them, the beam is previously swung out of the mirror array area. Under this arrangement, even if assembling errors occur, only by providing drive electrodes by which to direct the beam to inside the mirror array area, the beam can be directed to all mirrors. The electrodes to which a voltage is previously applied are referred to here as pre-charge electrodes. FIG. 12 shows an example where pre-charge electrodes are provided both at the upper stage and the lower stage. The electrodes located at the peripheral edges of the rows of electrodes are formed as follows. For example, a common electrode is formed to control a plurality of mirrors. For example, on the lower stage, a first pre-charge electrode 120 is provided connecting four drive electrodes to turn the movable frames down, and is connected by a wire to an external connection electrode 121. On the upper stage, a second pre-charge electrode 122 is formed connecting four drive electrodes to turn the movable frames up. On the upper stage, because it is impossible to directly connect the drive electrodes in the presence of the wires, an inter-electrode connection wire 123 is used to tie together the wires from the electrodes and this electrode connection wire is connected to an external connection electrode 124. In this manner, 8 electrodes are collected and decreased to 2, and the number of electrodes is decreased by 6. As the number of mirror arrays increases in the X-direction, more electrodes can be reduced. By reducing the number of electrodes, the multi-channel AMP ICs for voltage control and digital/analog conversion ICs can be decreased in number, production cost can be reduced, and the control circuit board can be decreased in size.

The pre-charge electrodes on the upper and lower stages may be put together to one electrode. What has been said about the drive electrodes for turning the movable mirrors to the outside of the mirror array area is also true of the mirrors at both extreme ends in the X-direction. The drive electrodes for the extreme-end electrodes may be connected and serve as a pre-charge electrode. Among the arrayed mirrors, if it has been determined which mirrors are used for input, the drive electrodes unnecessary to direct the beam to all mirrors on the output side may be omitted. For example, when a beam is emitted during assembling without driving the mirrors, if the beam comes back to an adjacent mirror row, a compensation value may be added to the pre-charge electrodes. If there are differences in error extent among the mirrors, a compensation value should be one for a largest error extent, for example. Make adjustments so that a reflected beam comes to a mirror which an emitted beam strikes initially when the pre-charge electrodes are driven. More preferably, a bias is set so that a reflected beam comes to outside the mirror row that the beam strikes initially (on the side opposite the side where there is an adjacent mirror row). When the optical switch is operated, the pre-charge electrodes are actuated also when the mirrors are driven by actuating other electrodes. By this, the number of electrodes can be decreased and the structure can be made simpler.

Figure 13:
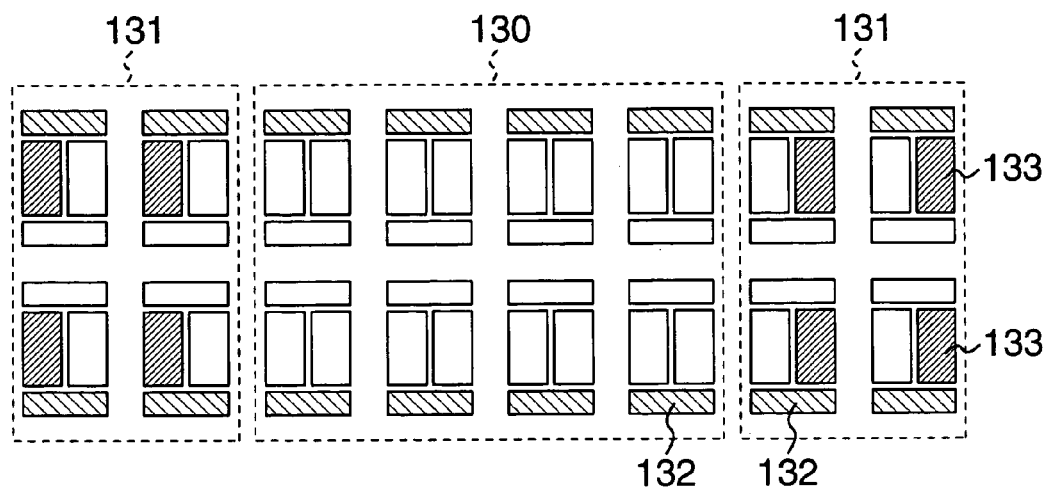
FIG. 13 is a schematic plan view showing a drive electrode layout in an example of an input/output electrode layout.
Figure 14:
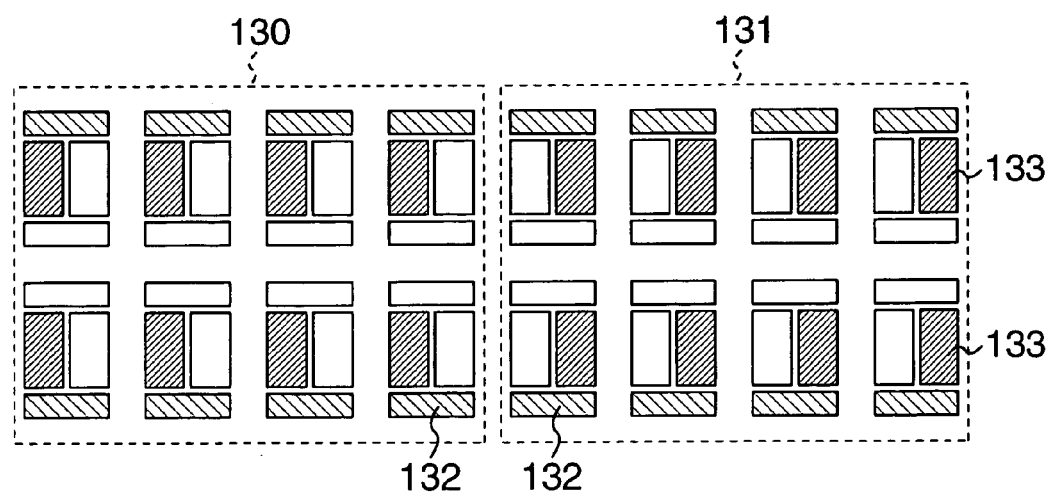
FIG. 14 is a schematic plan view showing a drive electrode layout in an example of an input/output electrode layout.

FIGS. 13 and 14 are schematic diagrams showing drive-electrode layouts when an 8-input 8-output optical switch by an 8-row 2-stage mirror array is formed. In this structure, to make the maximum deflection angle of the movable mirrors as small as possible, as shown in FIG. 13, preferably, 8 groups of electrodes in the center are collected as an input mirror group 130, 8 groups of electrodes on the outer sides are collected as an output mirror group 131 (input and output may be inverted). Thus, the mirrors at opposite ends are for output and they are not connected to each other, and the longest connection is among 6 mirrors in the X-direction. The mirrors of the input mirror group 130 need to turn to left and right but the mirrors of the output mirror groups 131 only need to turn to inside, and therefore one of each pair of the movable mirror drive electrodes may be treated as a non-drive electrode 133. The non-drive electrodes 133 are preferably connected to ground electrode so as to be at ground potential at all times. As has been described, the top electrodes on the upper side and the bottom electrodes on the lower side may be used as pre-charge electrodes 133. Therefore, in this example, a total of 22 electrodes can be done away with, that is, 14 electrodes by introduction of pre-charge electrodes and 8 electrodes by omission of non-drive electrodes.

FIG. 14 shows a case where the drive electrodes are split into two groups, an input mirror group 130 and an output mirror group 131 placed on each side. In this case, the mirrors at each end need to be connected. The maximum deflection angle of the mirrors is larger than in the example in FIG. 13. Both in the input mirror group 130 and the output mirror group 131, each one of each pair of drive electrodes to drive the movable mirrors may be treated as a non-drive electrode, and therefore non-drive electrodes amount to 16, and if this 16 and 14 electrodes made unnecessary by introduction of pre-charge electrodes makes a total of 30 electrodes that can be omitted.

As the voltage previously applied to the pre-charge electrodes increases, when the mirrors are turned by applying voltages applied the opposing drive electrodes, which results in large drive voltages being applied to both side of the mirrors, thereby increasing a general lowering of the mirrors and making it more difficult to take a sufficient mirror deflection angle. To lower the voltage on the pre-charge electrodes, it is desirable to reduce errors in assembling. As measures to this end, it is effective to use a method of controlling a shift in the optical axis of the collimator lens. Generally, collimator lenses have some measure of shift in optical axis with respect to the contour axis. As shown in FIG. 8, when inserting collimator lenses 3 in the hole array block 40, set the shift direction of the optical axis of the collimator lens 3 such that the beam is directed to outside of the mirror array area. In other words, if it is on the upper stage, the beam should be directed upwards. By having the optical axes aligned in this manner, the deflection angle of the mirrors can be made small by pre-charge in advance, and the voltage on the pre-charge electrode can be made small.

Similarly, by adjusting the direction of optical-axis shift to a direction in which the deflection angle required of the corresponding mirror is largest, the deflection angle required of the mirror can be reduced. For example, in the example in FIG. 14, preferably, the collimator lenses corresponding to the input mirror group 130 are set so that the beam tilts to the direction of the input mirror group 120.

To increase the above effect, one may as well prepare collimator lenses with a notable shift of optical axis deliberately. However, it is preferable to adjust the positions of the mirrors or give a margin to the size of the mirrors, for example, to prevent a notable worsening of insertion loss due to a beam going beyond the mirrors.

Figure 15:
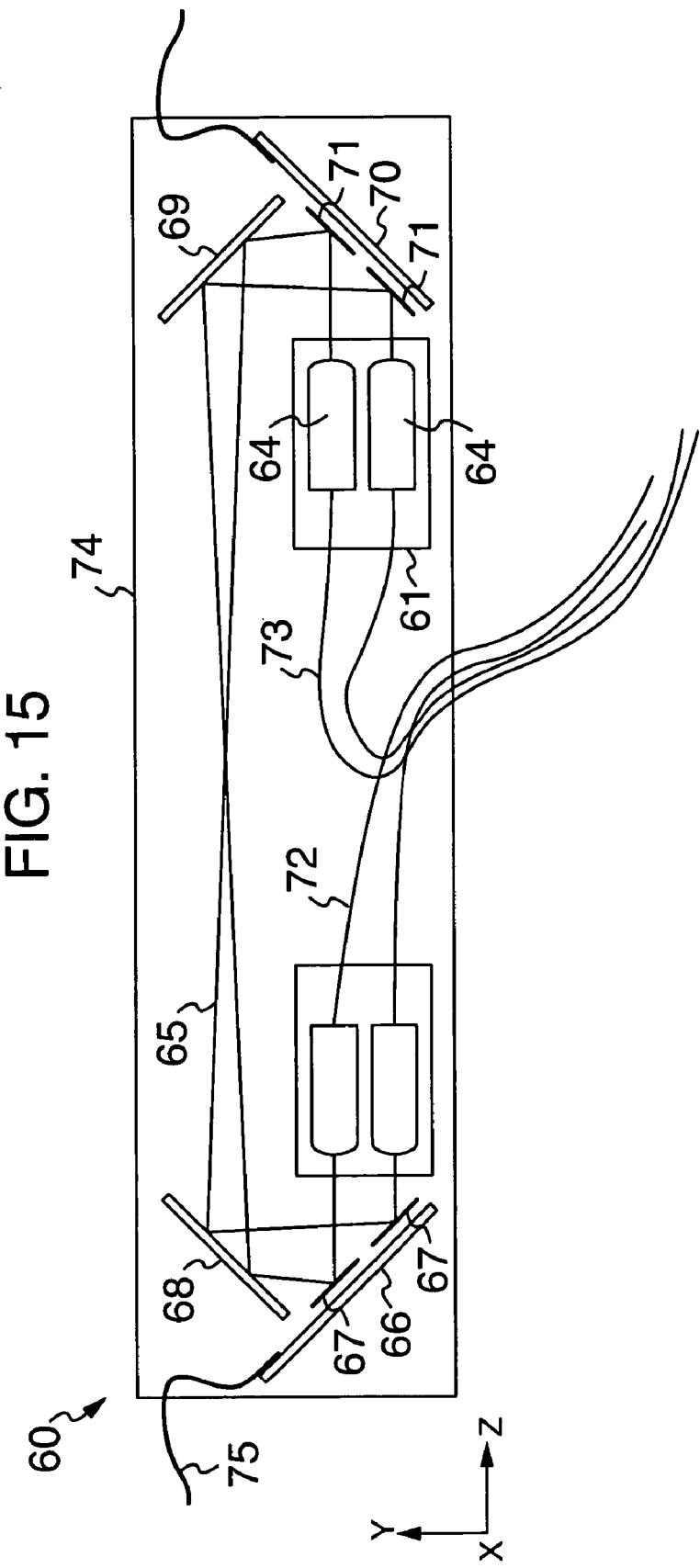
FIG. 15 is a schematic sectional view showing the structure of the optical switch according to a second embodiment of the present invention.

FIG. 15 is a schematic sectional diagram showing a second embodiment of the present invention. In the first embodiment shown in FIG. 1, the optical path is turned back by the second fixed mirror at a midway point of the optical path, whereas in this embodiment, the optical path is not turned back and a collimator array, a micro mirror array, and a fixed mirror are installed on the output side. In other words, an optical path when any input collimator 62 of the input collimator array 61 is coupled to any output collimator 64 of an output collimator array 63, a beam 65 leaving an input collimator is reflected by a input micro mirror 67 corresponding to an input micro mirror array 66, then reflected by an input fixed mirror 68, again reflected by an output fixed mirror 69, further reflected by an output micro mirror 71, which corresponds to an output collimator 64, of an output micro mirror array 70, and the beam is injected into the output collimator 64. By this structure, the number of channels that can be coupled is larger than in the first embodiment when the maximum optical path length, collimator array, and the maximum deflection angle of the micro mirrors are the same. However, the optical switch increases in length in the Z-direction, and two collimators cannot be coupled in one or the other of the collimator arrays.

Also in this embodiment, the assembled structure described in the first embodiment can be applied. In other words, for example, a collimator array, a micro mirror array, and a fixed mirror may be positioned on each of the input and output sides by pressing a collimator array block against a contact face formed on a common base and fixed. The fibers may be strung and placed in order in the space between the input collimator array and the output collimator array, and the input fibers 72 and the output fibers 73 may be bundled up and drawn out of the casing 74. To externally apply voltages to drive the mirrors, a flexible circuit board 75 may be extended to the outside of the casing 74. In this case, connector pins may be provided in the space between the input collimator array 61 and the output collimator array 63 in a manner of piercing the underside of the casing, and the input and output micro mirror arrays are connected through the flexible circuit board 75 to the connector pins, to which mirror-drive voltages can be applied.

In a case where a bounce-back mirror is not provided such as this, on the input side, the optical switch comprises an input-side collimator array with a plurality of collimators coupled to optical fibers; a mirror array with a plurality of movable mirrors to which light leaving a first collimator of the collimator array is optically coupled; and a first mirror to which light coming out of mirrors of the mirror array is coupled, and on the output side, the optical switch comprises an output-side collimator array with a plurality of collimators coupled to optical fibers; a mirror array with a plurality of movable mirrors to which light leaving a second collimator of the collimator array is optically coupled; and a second mirror optically coupled to mirrors of said first mirror, wherein it is preferably arranged that the light leaving the first mirror illuminates the second mirror.

The optical path between the first mirror and the second mirror includes a region extending more on the fiber side of each collimator than the other side thereof where the collimator and the fibers are coupled in the longitudinal direction of the collimator on the input side or on the output side.

For example, as viewed in a direction parallel with the direction of the optical path between the mirror array and the first mirror on the input side, the optical path between the first mirror and the second mirror is preferably formed in a position that the optical path laps over the collimator array.

For example, the optical path between the first mirror and the second mirror is preferably formed longer than the optical path between the movable mirrors of the mirror array and the first mirror on the input side.

A module on the input side or the output side includes a base, and support members for the input side or the output side, such as the first support member as shown in FIGS. 5–7, and the above-mentioned collimator array and the above-mentioned mirror array are mounted on the first support member. Such support members are provided both on the input side and output sides. More preferably, the structure is preferably such that the first mirror is mounted on as a support member on the input side and a second mirror is mounted as support member on the output side.

Preferably, a plurality of connectors for externally applying voltages to the mirrors is installed on the base in a region between the support members.

As mentioned above, in a structure in which a beam does not bounce back at a midway point of the optical path and a set of a collimator array, a micro mirror array and a fixed mirror is installed on each of the input and output sides, if the maximum optical path length, collimator arrays, and the maximum deflection angle and so on are the same, the number of channels that can be connected can be made larger than in the other structures described above. Also in this structure, like in the other structures, a small-size or thin-profile optical switch can be realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical switch comprising:
a collimator array including a plurality of input collimators and a plurality of output collimators at a same position coupled to optical fibers;
a mirror array with a plurality of movable mirrors in a common horizontal plane, said mirror array having optically coupled thereto a light leaving said collimator array;
a first mirror having optically coupled thereto the light leaving said movable mirrors of said mirror array;
a second mirror having optically coupled thereto the light leaving said first mirror; wherein the light leaving said second mirror passes through said first mirror and said mirror array, and optically couples to said collimator array,
wherein said movable mirrors of said mirror array switch combinations of said output collimators and said input collimators, and
said mirror array and said first mirror are disposed on collimator side compared to where said collimator array and said optical fiber are coupled in a longitudinal direction of said collimator array, and said second mirror is disposed on said optical fiber side compared to where said collimator array and said optical fiber array are coupled.

2. An optical switch according to claim 1, wherein said first and second mirrors are fixed in its plane direction.

3. An optical switch according to claim 1, wherein said mirror array and said first mirror are located more on the side of the collimators than the other side thereof where the collimators and said fibers are coupled in the longitudinal direction of said collimators.

4. An optical switch according to claim 1, wherein the optical path between said first mirror and said second mirror is formed longer than the optical path between said movable mirrors of said mirror array and said first mirror.

5. An optical switch according to claim 1, further comprising a base and a first support member mounted on said base, wherein said collimator array and said mirror array are mounted on said first support member.

6. An optical switch according to claim 5, further comprising a second support member mounted on said base, wherein said second mirror is mounted to second support member, and wherein a plurality of connectors for externally applying voltages to said mirrors are installed in the base in a range between said first support member and said second support member.

7. An optical switch according to claim 1, wherein the number of arrays of collimators arranged in a direction parallel with the direction from the mirror array to the first mirror is smaller than the number of said collimators arranged in a direction at right angles to said direction.

8. An optical switch according to claim 1, wherein optical path from said collimator to said mirror is in parallel with optical path from said first mirror to said second mirror.

9. An optical switch according to claim 2, wherein optical path from said collimator to said mirror is in parallel with optical path from said first mirror to said second mirror.

10. An optical switch comprising:
an input unit with a plurality of optical emitters coupled to optical fibers;

a mirror array with a plurality of movable mirrors illuminated by a light emitted from said optical emitters;
a first mirror illuminated by the light leaving said mirrors of said mirror array;
a second mirror illuminated by the light leaving said first mirror; and an output unit with a plurality of optical receivers coupled to optical fibers,
wherein the light leaving said second mirror passes through said first mirror and said mirror array and illuminates an optical receiver selected in said output unit, and
said mirror array and said first mirror are disposed on collimator side compared to where said collimator array and said optical fiber are coupled in a longitudinal direction of said collimator array, and said second mirror is disposed on said optical fiber side compared to where said collimator array and said optical fiber array are coupled.

11. An optical switch according to claim 10, wherein said first mirror and said second mirror is fixed in its surface direction.

12. An optical switch comprising:
a collimator array including a plurality of input collimators and output collimators at a same position coupled to optical fibers;
a mirror array with a plurality of movable mirrors having optically coupled thereto a light leaving said collimator array;
a first mirror having optically coupled thereto the light leaving said movable mirrors of said mirror array;
a second mirror having optically coupled thereto the light leaving said first mirror; and
wherein light leaving said second mirror passes through said first mirror and said mirror array, and is optically coupled to said collimator array, and
said movable mirrors of said mirror array switch combinations of said output collimators and said input collimators,
wherein as viewed in a direction parallel with the direction of the optical path between the mirror array and the first mirror on the input side, the optical path between the first mirror and the second mirror is preferably formed in a position that the optical path laps over the collimator array, and
said mirror array and said first mirror are disposed on collimator side compared to where said collimator array and said optical fiber are coupled in a longitudinal direction of said collimator array, and said second mirror is disposed on said optical fiber side compared to where said collimator array and said optical fiber array are coupled.

13. An optical switch according to claim 12, wherein said first mirror and said second mirror is fixed in its surface direction.

14. An optical switch according to claim 12, wherein optical path from said collimator to said mirror is in parallel with optical path from said first mirror to said second mirror.

15. A switch system comprising:
a board;
an optical switch coupled to optical fibers laid on said board for outputting light input from a first optical fiber to a second optical fiber selected by driving a movable mirror; and
a control IC for controlling a tilt of said movable mirror so that the input light is output to said second optical fiber,
wherein said optical switch comprises;

a collimator array including a plurality of input collimators and output collimators coupled to optical fibers;
a mirror array with a plurality of movable mirrors having optically coupled thereto a light leaving a first collimator coupled to said first optical fiber;
a first mirror having optically coupled thereto the light leaving said movable mirrors of said mirror array;
a second mirror having optically coupled thereto the light leaving said first mirror; and
a second collimator of said collimator array, said collimator having the light from said second mirror coupled thereto,
wherein the light leaving said second mirror passes the said first mirror and said mirror array, and optically couples to said second output collimator,
said plurality of input collimators and output collimators are provided at a same position,
wherein light leaving said second mirror passes through said first mirror and said mirror array, and is optically coupled to said collimator array,
said movable mirrors of said mirror array switch combinations of said output collimators and said input collimators, and
said mirror array and said first mirror are disposed on collimator side compared to where said collimator array and said optical fiber are coupled in a longitudinal direction of said collimator array, and said second mirror is disposed on said optical fiber side compared to where said collimator array and said optical fiber array are coupled.

16. An optical switch according to claim 15, wherein said first mirror and said second mirror is fixed in its surface direction.

17. An optical switch according to claim 15, wherein optical path from said collimator to said mirror is in parallel with optical path from said first mirror to said second mirror.

18. An optical switch comprising:
a first collimator array with a plurality of first collimators coupled to optical fibers;
a mirror array with a plurality of movable mirrors receiving a light from a collimator of said first collimator array;
a first mirror having optically coupled thereto light leaving a mirror of said mirror array; and
a second collimator array with a plurality of collimators coupled to optical fibers, a collimator of said second collimators having coupled thereto the light leaving said first mirror,
wherein said mirror of said mirror array has a common electrode for driving said plurality of movable mirrors, and
said mirror array and said first mirror are disposed on collimator side compared to where said collimator array and said optical fiber are coupled in a longitudinal direction of said collimator array, and said second mirror is disposed on said optical fiber side compared to where said collimator array and said optical fiber array are coupled.

19. An optical switch according to claim 18, wherein said first mirror and said second mirror is fixed in its surface direction.

20. An optical switch according to claim 18, wherein optical path from said collimator to said mirror is in parallel with optical path from said first mirror to said second mirror.

* * * * *